United States Patent
Arata et al.

(10) Patent No.: US 7,149,036 B2
(45) Date of Patent: Dec. 12, 2006

(54) SOLID IMMERSION LENS AND SAMPLE OBSERVATION METHOD USING IT

(75) Inventors: Ikuo Arata, Hamamatsu (JP); Hirotoshi Terada, Hamamatsu (JP)

(73) Assignee: Hamamatsu Photonics K.K., Shizuoka (JP)

( * ) Notice: Subject to any disclaimer, the term of this patent is extended or adjusted under 35 U.S.C. 154(b) by 0 days.

(21) Appl. No.: 11/265,496

(22) Filed: Nov. 3, 2005

(65) Prior Publication Data

US 2006/0109562 A1    May 25, 2006

Related U.S. Application Data (63) Continuation of application No. 10/804,193, filed on Mar. 19, 2004, now Pat. No. 7,046,449.

(30) Foreign Application Priority Data

| Mar. 20, 2003 | (JP) | ............................ P2003-078819 |
| May 23, 2003 | (JP) | ............................ P2003-146620 |

(51) Int. Cl.
*G02B 21/02* (2006.01)

(52) U.S. Cl. ...................... 359/656; 359/661; 359/664; 359/368

(58) Field of Classification Search ........ 359/656–661, 359/718, 719, 664, 368, 369, 808–811, 819
See application file for complete search history.

(56) References Cited

U.S. PATENT DOCUMENTS

| 5,004,307 | A | 4/1991 | Kino et al. ................... 350/1.2 |
| 5,125,750 | A | 6/1992 | Corle et al. .................. 359/819 |
| 5,208,648 | A | 5/1993 | Batchelder et al. ......... 356/237 |
| 5,220,403 | A | 6/1993 | Batchelder et al. ......... 356/345 |
| 5,939,709 | A | 8/1999 | Ghislain et al. ............ 250/216 |
| 6,369,957 | B1 | 4/2002 | Ishida ........................ 359/719 |
| 6,441,359 | B1 | 8/2002 | Cozier et al. ............... 250/216 |
| 6,475,398 | B1 | 11/2002 | Kitahata ........................ 216/2 |
| 6,560,030 | B1 | 5/2003 | Legrand et al. ............. 359/642 |
| 6,594,086 | B1 | 7/2003 | Pakdaman et al. .......... 359/656 |
| 6,608,359 | B1 | 8/2003 | Kitahata ..................... 257/432 |
| 6,621,275 | B1 | 9/2003 | Cotton et al. ............... 324/537 |
| 6,656,029 | B1 | 12/2003 | Kitahata ..................... 451/384 |
| 6,687,058 | B1 | 2/2004 | Ippolito et al. ............. 359/656 |
| 6,778,327 | B1 * | 8/2004 | Pakdaman et al. .......... 359/656 |

(Continued)

FOREIGN PATENT DOCUMENTS

EP    0 977 192 A1    2/2000

(Continued)

*Primary Examiner*—Ricky Mack
*Assistant Examiner*—M. Hasan
(74) *Attorney, Agent, or Firm*—Drinker Biddle & Reath LLP (57) ABSTRACT

Using a solid immersion lens (SIL) having a spherical lens surface with a radius of curvature $R_L$ from a material having a refractive index $n_L$, an image of a sample is observed. A geometric aberration characteristic caused by the SIL is evaluated by using a predetermined optical system. Using a coefficient k (0<K<1) set to satisfy a condition where the average image surface becomes flat or a condition yielding a favorable chromatic aberration characteristic, the sample is observed with the solid immersion lens while a surface, orthogonal to the optical axis, including a point located downstream of the spherical center C of the lens surface 10 by $k \times (R_L/n_L)$ along the optical axis is employed as a sample observation surface 20. This realizes a sample observation method that can observe the image of the sample favorably with a solid immersion lens, and the solid immersion lens.

6 Claims, 12 Drawing Sheets

U.S. PATENT DOCUMENTS

| | | | |
|---|---|---|---|
| 6,831,782 B1 * | 12/2004 | Patton et al. | 359/396 |
| 6,944,112 B1 * | 9/2005 | Challener | 369/112.27 |
| 2003/0202255 A1 | 10/2003 | Pakdaman et al. | 359/656 |
| 2003/0210057 A1 | 11/2003 | Cotton et al. | 324/501 |

FOREIGN PATENT DOCUMENTS

| | | |
|---|---|---|
| JP | 05-157701 | 6/1993 |
| JP | 7-18806 | 3/1995 |
| JP | H8-315404 | 11/1996 |
| JP | 11-003534 | 1/1999 |
| JP | H11-202194 | 7/1999 |
| JP | H11-203711 | 7/1999 |
| JP | 2000-011423 | 1/2000 |
| JP | 2000-121930 | 4/2000 |
| JP | 2001-023230 | 1/2001 |
| JP | 2002-189000 | 7/2002 |
| JP | 2002-236087 | 8/2002 |

* cited by examiner

Fig.1

RELATED ART

Fig.2

RELATED ART

SOLID IMMERSION LENS AND SAMPLE OBSERVATION METHOD USING IT

CROSS REFERENCE TO ANY RELATED APPLICATIONS

This is a continuation application of prior application Ser. No. 10/804,193, filed on March 19, 2004 now U.S. Pat. No. 7,046,449. The application Ser. No. 10/804,193 is incorporated by reference herein in its entirety.

BACKGROUND OF THE INVENTION

1. Field of the Invention

The present invention relates to an observation method for observing a sample by using a solid immersion lens, and the solid immersion lens.

2. Related Background Art

As a lens for magnifying a light image from a sample to be observed, a solid immersion lens (SIL) has been known. The SIL is a lens having a hemispherical form or a hyper-hemispherical form known as Weierstrass sphere. When the SIL is placed in close contact with a surface of a sample, both the numerical aperture NA and magnification can be enlarged in the sample observation, which enables the observation with a high spatial resolution (see Japanese Patent Publication No. HEI 7-18806 and Japanese Patent Application Laid-Open No. 2002-189000).

SUMMARY OF THE INVENTION

The SIL has been known to form an aplanatic image without spherical aberration and coma aberration in the above-mentioned hemispherical or hyperspherical form and the sample observation surface set in conformity thereto. However, the aberrations are lost at only one point in any of such configurations and conditions of use of the SIL. Therefore, the application of SIL is limited to optical pickups and the like.

Namely, image surface characteristics are not favorable in the sample observation surface used in the SIL when observing a sample over a wide range. Hence, when observing an image of a sample with the SIL, the resolution may become lower in peripheral parts of the resulting image than its center part, or the periphery or the center and its vicinity may become hard to see under the influence of curvature of field, thereby restricting the field of view usable for observations, and so forth.

In order to overcome the foregoing problems, it is an object of the present invention to provide a sample observation method which can favorably observe an image of a sample by using a solid immersion lens, and the solid immersion lens.

For achieving such an object, the present invention provides a sample observation method using a solid immersion lens having a spherical optical surface with a radius of curvature $R_L$ formed from a material having a refractive index $n_L$; wherein the sample is observed with the solid immersion lens, while using as a sample observation surface a surface, substantially orthogonal to an optical axis, including a point located downstream of a spherical center of the optical surface by $k \times (R_L/n_L)$ along the optical axis, where k ($0<k<1$) is a coefficient set such that the solid immersion lens yields a geometric aberration characteristic satisfying a predetermined condition.

In the sample observation method, the coefficient k is set by evaluating the geometric aberration characteristic caused by the solid immersion lens without employing a configuration corresponding to a hemispherical form using a surface including the spherical center as a sample observation surface or a configuration corresponding to a hyperhemispherical form using a surface including a point located downstream of the spherical center by $R_L/n_L$ along the optical axis as a sample observation surface. Using a surface including the point determined by the coefficient k as a sample observation surface, the sample is observed. This widens the field of view usable for observations, thereby making it possible to observe an image of a sample favorably with the solid immersion lens.

Preferably, when evaluating the geometric aberration characteristic caused by the solid immersion lens, the geometric aberration characteristic is evaluated with a virtual optical system using a back focal plane of the solid immersion lens as a pupil plane, and the coefficient k is set according to a result of the evaluation. In this case, using the back focal plane of the solid immersion lens as the pupil plane can make the object side telecentric, thus yielding a form practically suitable for observing reflected light with laser scanning, etc. It has been found that, when a solid immersion lens is used in combination with an actual microscope, the pupil position of an objective lens of the microscope fails to function as a pupil, whereby the pupil of an optical system including the solid immersion lens becomes the back focal position of the solid immersion lens.

Preferably, the geometric aberration characteristic caused by the solid immersion lens is evaluated by a sagittal image surface, a meridional image surface, or an average image surface of the sagittal image surface and meridional image surface, and the coefficient k is set according to a result of the evaluation. In this case, the geometric aberration characteristic on the sample observation surface caused by the solid immersion lens can be set favorably.

The sample observation method may be such that the solid immersion lens has a thickness of $d_L = R_L + k \times (R_L/n_L)$ along the optical axis, and the sample observation surface coincides with the sample-side lens surface of the solid immersion lens. Alternatively, the sample observation method may be such that the solid immersion lens has a thickness of $d_L < R_L + k \times (R_L/n_L)$ along the optical axis, the sample observation surface is a virtual observation surface assuming that the sample has a refractive index equal to the refractive index $n_L$ of the solid immersion lens, and the thickness of the solid immersion lens satisfies $d_L = L - t_S \times (n_L/n_S)$ with respect to the length $L = R_L + k \times (R_L/n_L)$ along the optical axis from a vertex to the virtual observation surface, where $n_S$ is the refractive index of the sample, and $t_S$ is the thickness of the sample to the actual observation surface.

In another aspect, the present invention provides a solid immersion lens having a spherical optical surface with a radius of curvature $R_L$ formed from a material having a refractive index $n_L$; wherein the distance along an optical axis from a vertex to a virtual observation surface assuming that a sample to be observed has a refractive index equal to the refractive index $n_L$ of the solid immersion lens is $L = R_L + k \times (R_L/n_L)$, where k ($0<k<1$) is a coefficient set such that the solid immersion lens yields a geometric aberration characteristic satisfying a predetermined condition; and wherein the solid immersion lens has a thickness satisfying $d_L = L - t_S \times (n_L/n_S)$ along the optical axis, where $n_S$ is the refractive index of the sample, and $t_S$ is the thickness of the sample to an actual observation surface.

In the above-mentioned solid immersion lens, the lens form is set in view of the refractive index $n_S$ and thickness $t_S$ of a sample such as a substrate to be observed while using the coefficient k set by evaluating the geometric aberration characteristic caused by the solid immersion lens. This makes it possible to favorably observe a desirable part to be observed in the sample while widening the field of view usable for observations as mentioned above.

Preferably, in the sample observation method and solid immersion lens mentioned above, the coefficient k is a value within the range of 0.5<k<0.7. This enables observations under such a condition that the solid immersion lens yields a substantially flat image surface characteristic.

Preferably, the coefficient k is a value within the range of 0<k≦0.5. This enables observations under such a condition that the chromatic aberration and spherical aberration caused by the solid immersion lens are substantially lowered.

DESCRIPTION OF THE PREFERRED EMBODIMENTS

In the following, preferred embodiments of the solid immersion lens in accordance with the present invention and the sample observation method using the same will be explained in detail with reference to the drawings. In the explanation of the drawings, constituents identical to each other will be referred to with numerals identical to each other without repeating their overlapping descriptions. Ratios of dimensions in the drawings do not always match those explained.

First, an outline of the sample observation method using a solid immersion lens (SIL) in accordance with the present invention will be explained together with the configuration and condition of use of a conventionally employed SIL.

Figure 1:
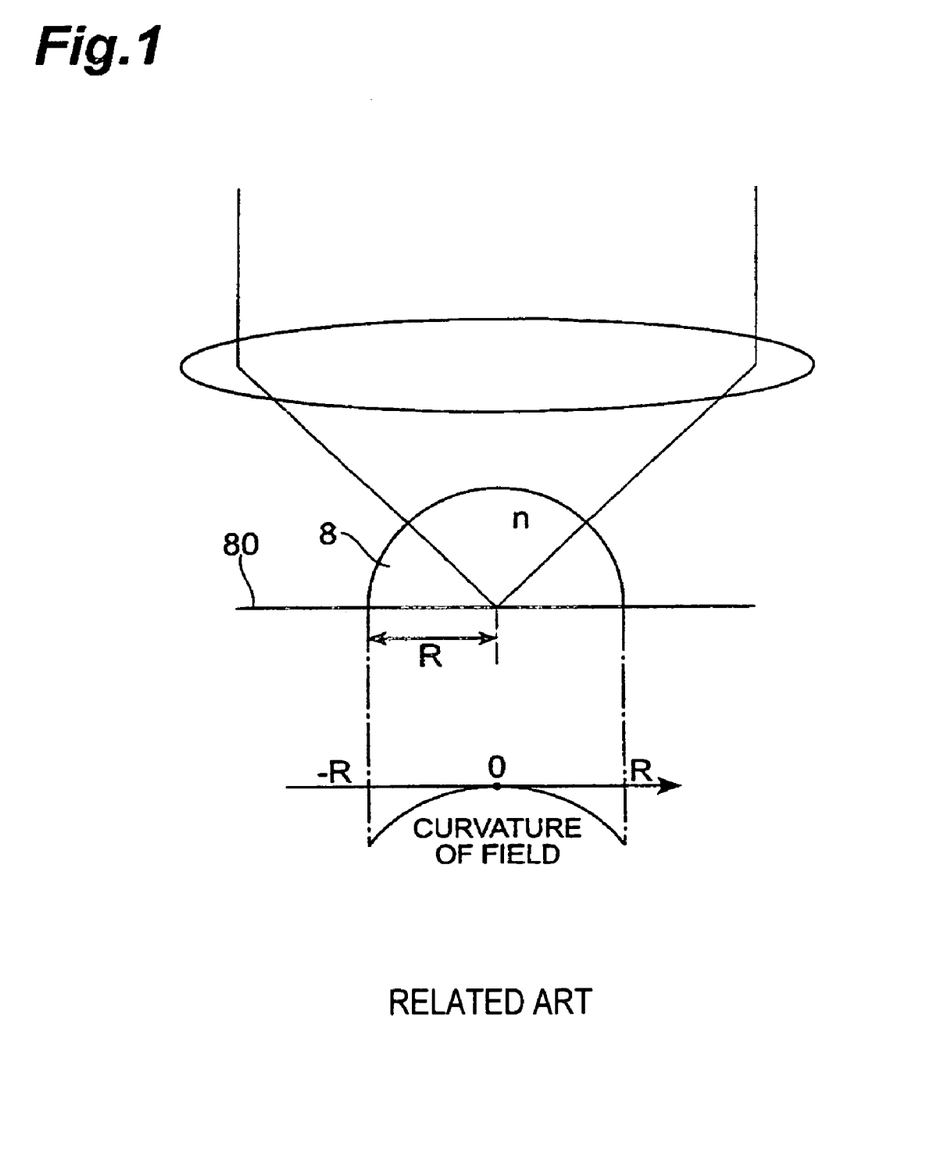
FIG. 1 is a view showing an example of configuration and condition of use of a conventional solid immersion lens.

FIG. 1 is a view showing an example of the configuration and condition of use of the conventional SIL. The SIL 8 shown in FIG. 1 is a lens having a hemispherical form with a refractive index n and a radius of curvature R. In such an SIL 8, the spherical center is a focal point, and a surface including the spherical center is set as a sample observation surface 80. Both the numerical aperture NA and magnitude in the sample observation are multiplied by n. In image surface characteristics of the SIL 8 in such a configuration, a curvature of field occurs such that the image surface shifts downstream as being distanced farther from the focal point as shown in FIG. 1.

Figure 2:
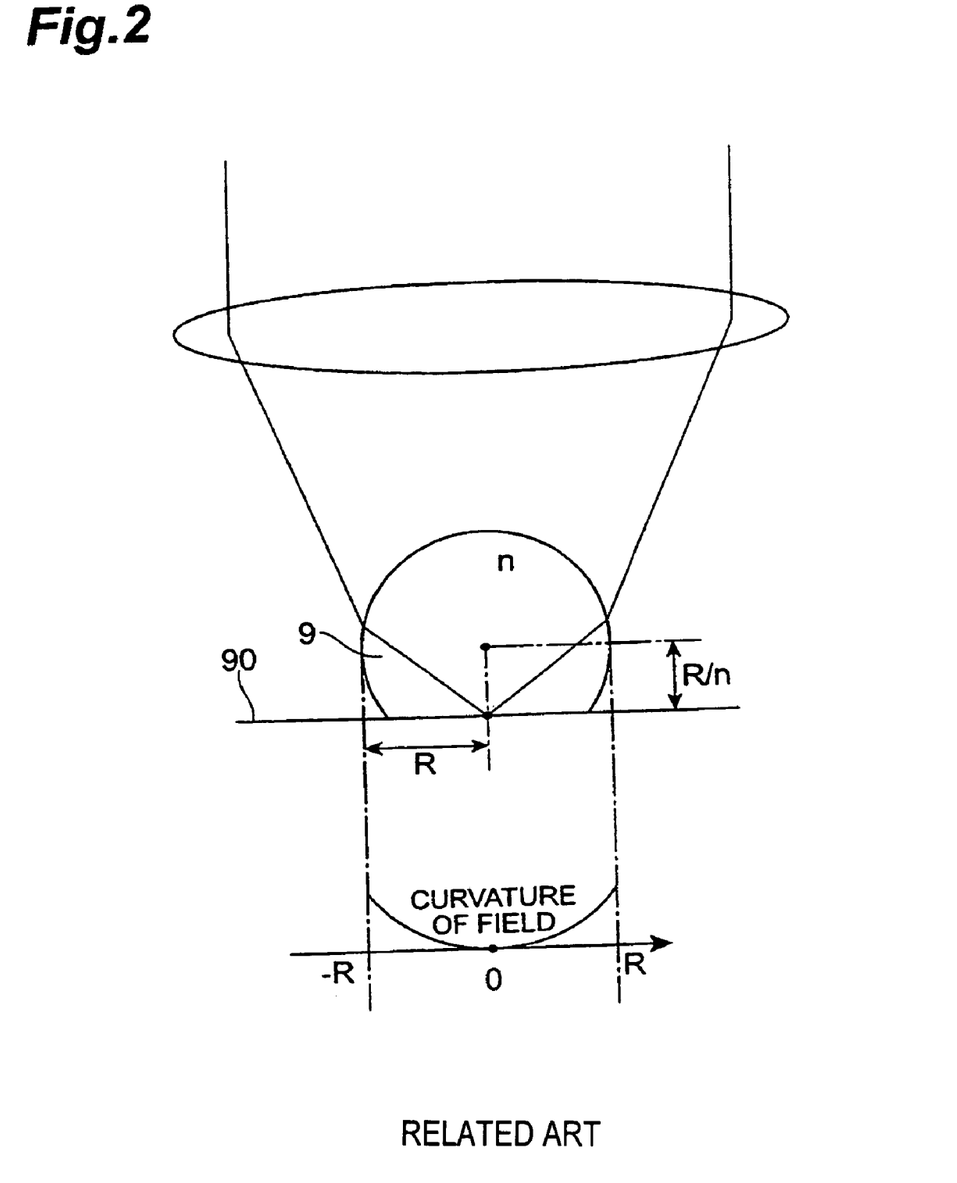
FIG. 2 is a view showing another example of configuration and condition of use of the conventional solid immersion lens.

FIG. 2 is a view showing another example of the configuration and condition of use of the conventional SIL. The SIL 9 shown in FIG. 2 is a lens having a hyperhemispherical form with a refractive index n and a radius of curvature R. In such an SIL 9, a point located downstream of the spherical center by R/n along the optical axis is a focal point, and a surface including this point is set as a sample observation surface 90. Both the numerical aperture NA and magnitude in the sample observation are multiplied by $n^2$. In image surface characteristics of the SIL 9 in such a configuration, a curvature of field occurs such that the image surface shifts upstream in the direction opposite from that of FIG. 1 as being distanced farther from the focal point as shown in FIG. 2.

The inventor studied the occurrence of such a curvature of field in sample observations using SIL in detail and, as a result, has found that the magnification changes from n to $n^2$, between the spherical center, which is assumed to be the focal point in the above-mentioned configuration, and the point located downstream of the spherical center by R/n along the optical axis, and the curvature of field changes between those showing in FIGS. 1 and 2 directed opposite from each other. The sample observation method using an SIL in accordance with the present invention observes an image of a sample by using a configuration and a condition of use of the SIL which are suitable for imaging according to the findings mentioned above.

Figure 3:
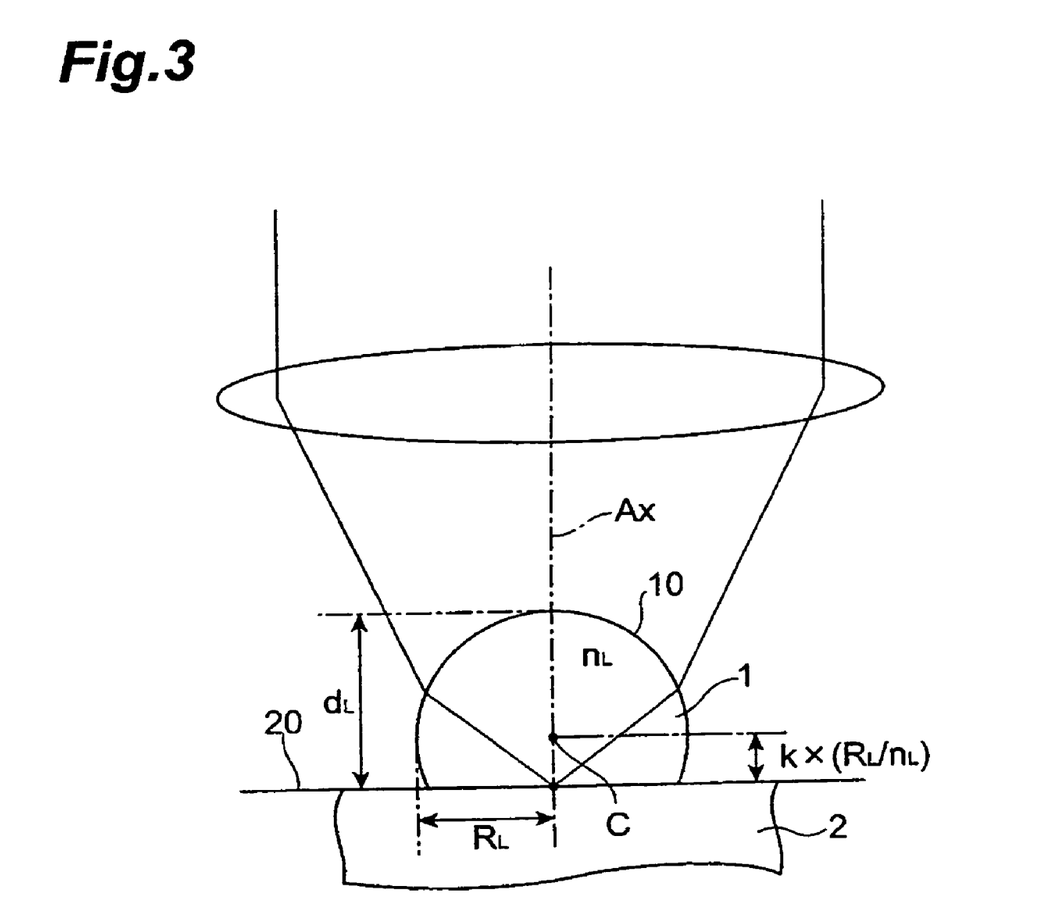
FIG. 3 is a view showing the configuration and condition of use of a solid immersion lens employed in the sample observation method in accordance with the present invention.

FIG. 3 is a view showing an embodiment of the sample observation method in accordance with the present invention, and the configuration and condition of use of the solid immersion lens used therefor. The sample observation method uses an SIL 1 formed from a material having a refractive index $n_L$ as a lens for enlarging a light image from a sample 2 to be observed. The SIL 1 is formed such that a spherical optical surface 10 having a radius of curvature $R_L$ about a point C as its spherical center is employed as a lens surface while an axis Ax acts as an optical axis.

In a sample observation using such an SIL 1, a point located downstream of the spherical center C of the spherical lens surface 10 by $k \times (R_L/n_L)$ along the optical axis Ax is employed as a focal point. Using a surface 20 which includes this focal point and is substantially orthogonal to the optical axis Ax as a sample observation surface, the sample is observed with the SIL 1.

Here, the above coefficient k determining the focal point caused by the SIL 1 and the position of the sample observation surface 20 as seen from the spherical center C is a coefficient set so as to fall within the range of 0<k<1. Therefore, the focal point is located between the spherical center C and the point located downstream of the spherical center C by $R_L/n_L$ along the optical axis. In particular, the coefficient k is set such that the SIL 1 yields a geometric aberration characteristic satisfying a predetermined condition.

As mentioned above, the magnification and curvature of field change successively between the spherical center C and the point located downstream of the spherical center C by $R_L/n_L$ along the optical axis Ax. For such changes in characteristics, geometric aberration characteristics caused by the SIL 1, changes therein, etc. are evaluated. According to the result of evaluation, an appropriate coefficient k is set, and the focal point is selected thereby. Using a surface including the point determined by the coefficient k as the sample observation surface 20, an image of the sample 2 is observed. Here, the SIL 1 can be used under a condition in which the curvature of field is made smaller and the deterioration in aberration is sufficiently suppressed. This widens the field of view usable for observation, thereby making it possible to observe the image of the sample 2 favorably with the SIL 1.

Figure 4:
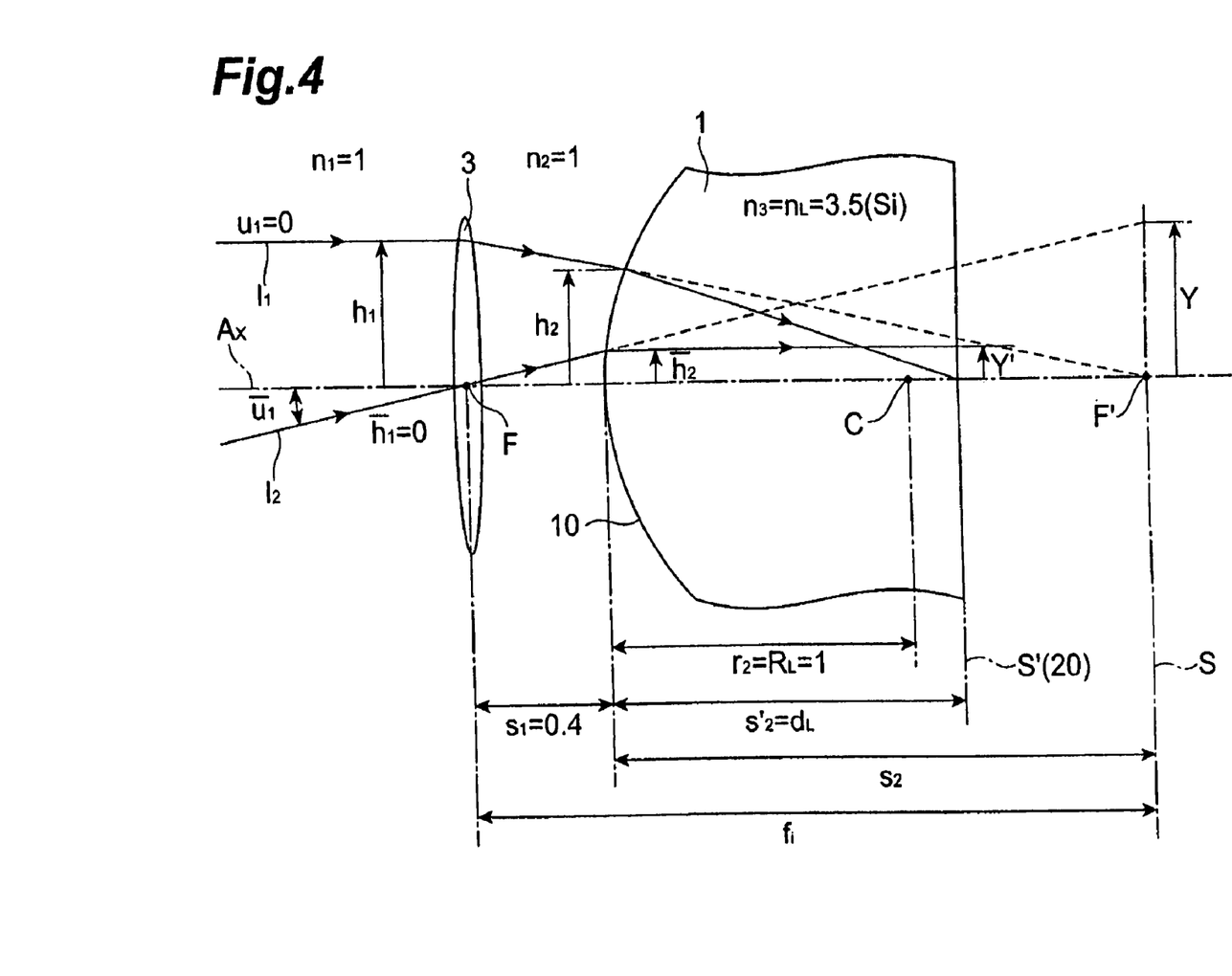
FIG. 4 is a view showing a virtual optical system employed for evaluating geometric and chromatic aberration characteristics caused by the solid immersion lens shown in FIG. 3.
Figure 5:
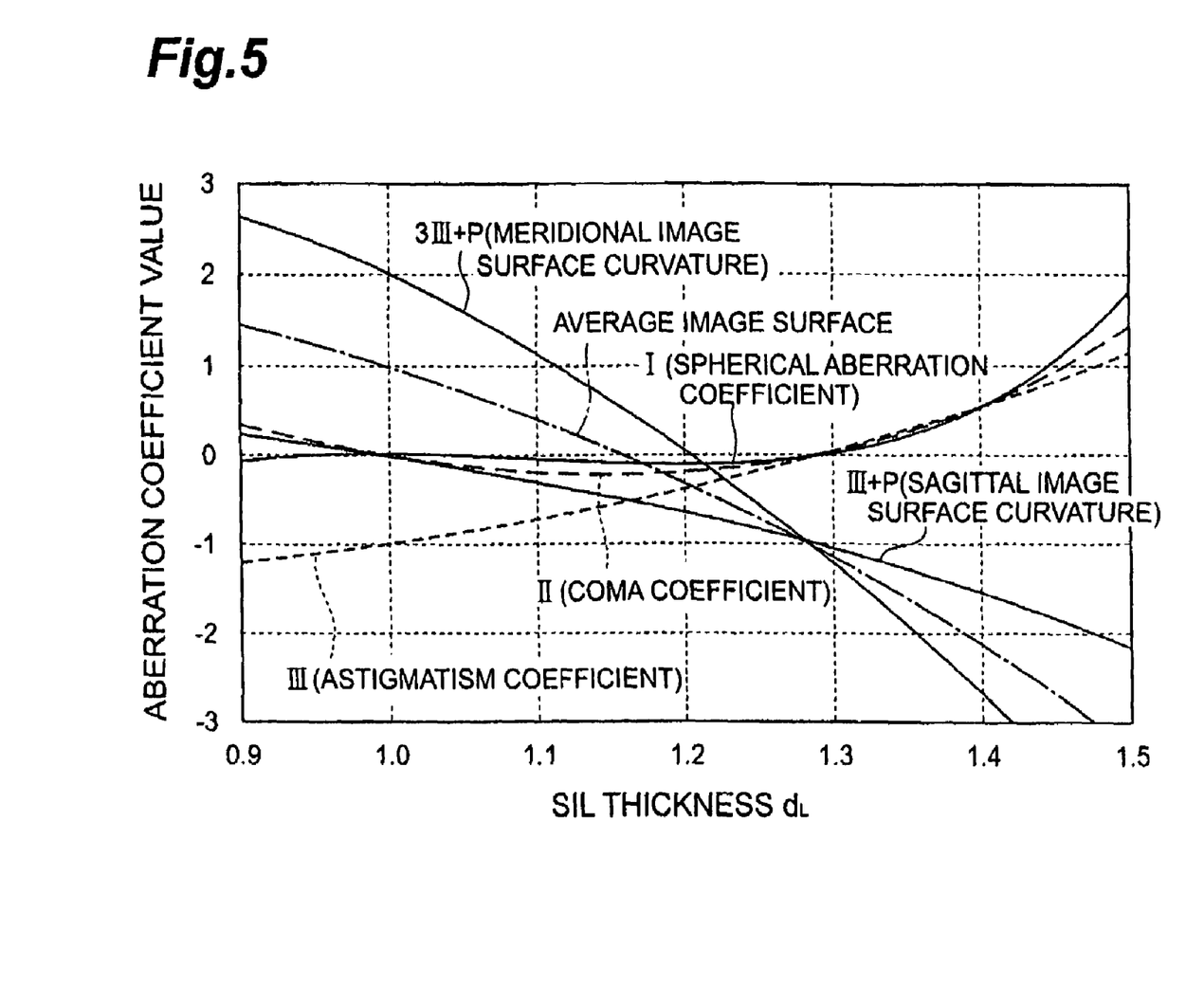
FIG. 5 is a graph showing characteristics of the solid immersion lens evaluated by using the virtual optical system shown in FIG. 4.

In the example shown in FIG. 3, the sample observation surface 20 determined by the coefficient k coincides with a planar lens surface of the SIL 1 on the sample 2 side. Here, the distance from the vertex of the SIL 1 to the lens surface on the sample 2 side, i.e., the thickness of SIL 1 along the optical axis Ax, is $d_L = R_L + k \times (R_L/n_L)$ A method of evaluating aberrations and image surface characteristics when observing an image of a sample by using the SIL 1, a configuration suitable for the SIL 1, conditions of use, etc. will now be explained specifically with reference to FIGS. 4 and 5. FIG. 4 is a view showing a virtual optical system used for evaluating geometric and chromatic aberration characteristics caused by the SIL shown in FIG. 3. FIG. 5 is a graph showing characteristics of the SIL evaluated by using the virtual optical system shown in FIG. 4.

In FIG. 4, n is the refractive index, s is the distance from the object surface to a principal plane, and h is the height of a light beam. Overline bars indicate quantities concerning principal rays. In the specification, overlined "$h_1$", for example, will be referred to as "$\bar{h}_1$".

First, the virtual optical system for evaluating image surface characteristics caused by the SIL will be explained. Here, as shown in FIG. 4, silicon (Si) is assumed to be a material for the SIL 1, while its refractive index is set such that $n_3 = n_L = 3.5$. In the region excluding the inside of the SIL 1 with the refractive index $n_3$, the refractive index is set such that $n_1 = n_2 = 1$. For the lens surface 10 formed like a spherical surface about the spherical center C, its radius of curvature is set such that $r_2 = R_L = 1$.

For evaluating the aberration and image surface characteristics of such an SIL 1, a virtual optical system using the back focal plane of the SIL 1 as a pupil plane is introduced. Specifically, as shown in FIG. 4, a virtual objective lens 3 having no aberration is introduced so as to be placed at the back focal point F of the SIL 1. The distance $s_1$ between the vertex of the lens surface 10 of the SIL 1 and the back focal point F is determined by $s_1 = r_2/(n_3 - n_2)$. In the above-mentioned example where $n_3 = 3.5$, $s_1 = 0.4 \times R_L = 0.4$.

In addition, a focal length of this aberration-free virtual objective lens 3 is provided as fi, and a front focal position is provided as F'. The thickness $s_2'$ of the SIL 1 is set to the distance from the focal position where light emitted with $u_1 = 0$ and $h_1$ from the virtual objective lens 3 is focused by the lens surface 10 to the vertex of the lens surface 10. When the SIL 1 is evaluated by using the virtual optical system in which such a virtual objective lens 3 is introduced, the entrance pupil of the whole optical system is set onto the virtual objective lens 3 located at a position separated from the lens surface 10 by $s_1 = 0.4 \times R_L$. When the entrance pupil and the like are set as such, telecentricity is obtained inside the SIL 1, and thus can attain a form in conformity to an actual observation system for observing reflected light with laser scanning, etc. As a consequence, aberration and image surface characteristics caused by the SIL 1 can appropriately be evaluated.

FIG. 4 illustrates two light beams $1_1$, $1_2$ together with configurations of the SIL 1 and the optical system constructed by the virtual objective lens 3. The light beam $1_1$ is such that it forms an angle of $u_1 = 0$ with the optical axis Ax, and has heights $h_1$ and $h_2$ at the virtual objective lens 3 and the lens surface 10 of the SIL 1, respectively, and becoming a light beam parallel to the optical axis Ax on the side upstream of the virtual objective lens 3. The light beam 11 passes a point on the optical axis Ax in a surface S' corresponding to the sample observation surface 20. When there is no SIL 1, the light beam $1_1$ passes a point F' on the optical axis Ax in the focal plane S of the virtual objective lens 3 as indicated by a dashed line.

The light beam $1_2$ forms an angle of $\bar{u}_1$ with the optical axis Ax and has respective heights of $\bar{h}_1 = 0$ and $\bar{h}_2$ at the virtual objective lens 3 and the lens surface 10 of the SIL 1, respectively, and becoming a light beam parallel to the optical axis Ax on the side downstream of the lens surface 10. The light beam $1_2$ passes a point F on the optical axis Ax in the virtual objective lens 3, and yields a distance Y' from the optical axis Ax in the sample observation surface S'. When there is no SIL 1, as indicated by a dashed line, the light beam $1_2$ yields a distance Y from the optical axis Ax in the focal plane S.

It is also assumed that the distance from the vertex of the lens surface 10 of the SIL 1 to the focal plane S is $s_2$, and that the distance to the sample observation surface S', i.e., the thickness of SIL 1, is $s_2' = d_L$. In the virtual optical system of FIG. 4 having the foregoing configuration and condition, aberration coefficients of the spherical aberration coefficient I, coma coefficient II, astigmatism coefficient III, Petzval sum P, sagittal image surface curvature III+P, and meridional image surface curvature 3III+P in the SIL 1 are represented by the thickness $d_L$ of the SIL 1 respectively as the following expressions (1) to (6):

$$I = h_2^4 \cdot Q_2^2 \cdot \Delta(1/n_L s)_2 \quad (1)$$
$$= (d_L/1.4)^4 \cdot \{4.9(d_L - 1)/d_L\}^2 \cdot (3.5 - 4.5/d_L)$$
$$= 6.25(d_L - 1)^2 (3.5 d_L - 4.5) d_L$$

$$II = J_2 \cdot I = 2.5(d_L - 1)(3.5 d_L - 4.5) d_L \quad (2)$$

$$III = J_2 \cdot II = (3.5 d_L - 4.5) d_L \quad (3)$$

$$P = p = (1/n_2 - 1/n_3)/r_2 = 1 \quad (4)$$

$$III + P = 1 + (3.5 d_L - 4.5) d_L \quad (5)$$

$$3III + P = 1 + 3(3.5 d_L - 4.5) d_L \quad (6)$$

Here, $Q_2$ is the Abbe's invariant. $Q_2$ and $J_2$ are represented by the following expressions:

$$Q_2 = n_2(1/r_2 - 1/s_2) = 4.9(d_L - 1)/d_L$$

$$J_2 = \bar{Q}_2 \bar{h}_2 / Q_2 h_2$$

Respective curvatures (in actual size) of the Petzval image surface, sagittal image surface, and meridional image surface are as follows:

$-P/fi=-0.7143$ (1/mm)=Fixed . . . Petzval image surface $-\{1+(3.5d_L-4.5)d_L\}/1.4$ (1/mm) . . . Sagittal image surface $-\{1+3(3.5d_L-4.5)d_L\}/1.4$ (1/mm) . . . Meridional image surface FIG. 5 is a graph showing the aberration coefficients of the spherical aberration coefficient I, coma coefficient II, astigmatism coefficient III, sagittal image surface curvature III+P, and meridional image surface curvature 3III+P determined by the above-mentioned expressions, respectively, and an average image surface of the sagittal image surface and meridional image surface. In this graph, the abscissa indicates the thickness $s_2'=d_L$ of SIL, whereas the ordinate indicates the value of each aberration coefficient. Since $R_L=1$ in FIG. 4, the thickness $d_L$ shown in the abscissa and the coefficient k shown in FIG. 3 have the relationship of $k=n_L\times(d_L-1)=3.5\times(d_L-1)$ therebetween.

In the individual curves shown in FIG. 5, both the spherical aberration coefficient I and coma coefficient II are zero at each of the point of $d_L=R_L=1$ corresponding to the case where a surface including the spherical center is taken as the sample observation surface (see FIG. 1) and the point of $d_L=R_L+R_L/n_L=1.286$ corresponding to the case where a surface including the point located downstream of the spherical center by $R_L/n_L$ along the optical axis is taken as the sample observation surface (see FIG. 2), thus satisfying an aplanatic condition. However, the curvature of field is generated in these points as mentioned above. At the point of $d_L=1$, the sagittal image surface curvature III+P is also zero. At the point of $d_L=1.286$, the astigmatism aberration coefficient III is also zero.

By contrast, the average image surface of the sagittal image surface and meridional image surface is seen to be flat at the point of $d_L=R_L+k(R_L/n_L)=1.163\times R_L=1.163$. Namely, for satisfying a condition under which the average image surface becomes a plane perpendicular to the optical axis, which is a condition yielding a flat surface so that a large field of view can be obtained, it will be sufficient if the curvature of field is such that III+P=−(3III+P). Under this condition, $d_L=1.163$ is obtained from the expressions mentioned above. Here, the coefficient set with respect to the sample observation surface is determined as about 0.6 (k=0.57). When a sample is observed with the SIL 1 while using the configuration and condition of use employing thus determined coefficient k, a favorable image of the sample can be obtained in a wide field of view.

When calculated under a condition with a normal entrance pupil position in which the outside of the SIL is telecentric, the average image surface becomes flat at the point where the SIL has a thickness of $1.274\times R_L$, which is a calculation result totally different from that mentioned above.

The solid immersion lens in accordance with the present invention and the sample observation method using the same are not limited to the embodiment mentioned above, but can be modified in various manners. For instance, though the material for SIL is exemplified by silicon in the above-mentioned example, various materials other than silicon may be used according to materials of samples employed, observation conditions, etc.

In the above-mentioned example, the refractive index of SIL is held constant at 3.5. This corresponds to a sample observation at a single wavelength, or a case where changes in refractive index caused by wavelength are negligible. Therefore, the condition where k is near 0.6 as mentioned above is effective when carrying out an observation, an inspection, or the like of the sample with light having a single wavelength.

In an observation of emission with a broad wavelength width or the like, e.g., an observation at a wavelength width of 750 nm to 1050 nm, by contrast, chromatic aberration is favorably balanced with other aberrations in the SIL made of silicon if k is about 0.3. It is thus preferred that the evaluation of image surface characteristics, the setting of coefficient k, etc. be carried out while taking account of the observation wavelength width if necessary.

In the example mentioned above, the coefficient k is set by the point at which the average image surface becomes flat. In this case, image surface characteristics caused by the SIL in the sample observation surface can favorably be set. The coefficient k may be set by a point within a predetermined condition range near the point where the average image surface becomes flat. The coefficient k may also be set by a point where the sagittal image surface or meridional image surface becomes flat instead of the average image surface.

Figure 6:
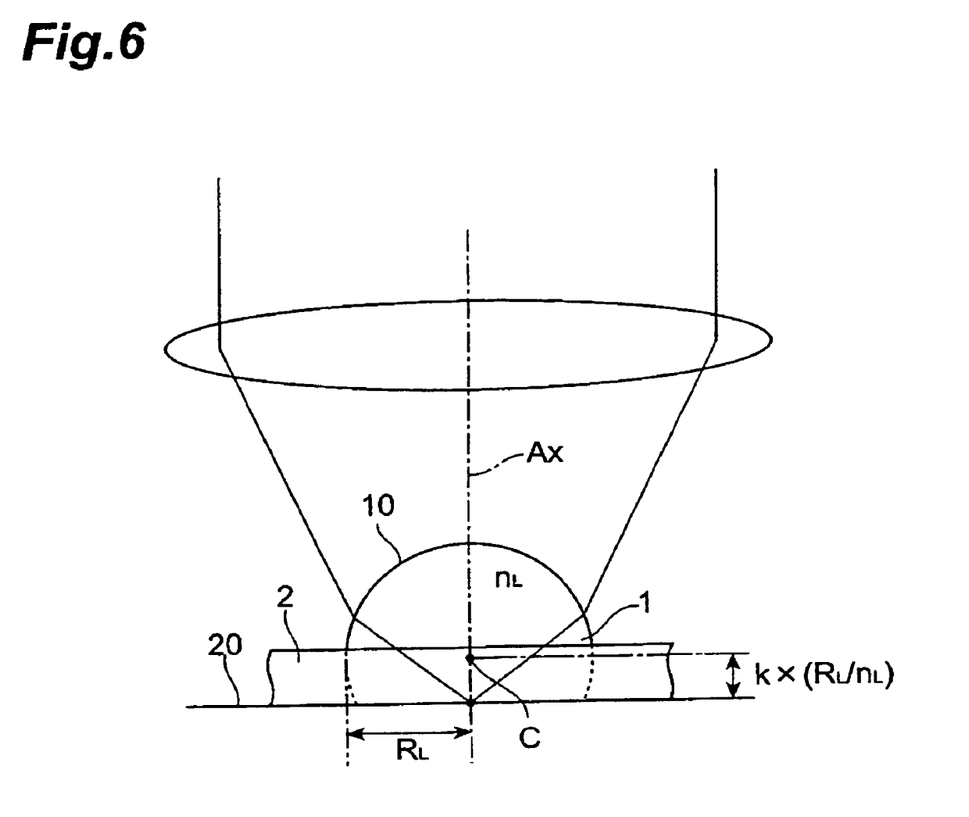
FIG. 6 is a view showing another example of configuration and condition of use of the solid immersion lens employed in the sample observation method in accordance with the present invention.

Though FIG. 3 shows a configuration in which the surface of the sample 2 becomes the sample observation surface 20, the method of placing the SIL with respect to the sample is not limited thereto. FIG. 6 is a view showing another example of the configuration and condition of use of the solid immersion lens employed in the sample observation method in accordance with the present invention. In this example, while the SIL 1 made of silicon is employed with respect to a silicon substrate 2 which is a sample, the rear face of the substrate 2 is used as the sample observation surface 20.

In such a configuration, a predetermined part of the silicon substrate 2 functions as a downstream side part of the SIL 1, whereby an image of the sample can be observed as in the case where the front face is used as the sample observation surface 20. Such an observation method can be employed when inspecting a semiconductor device by a rear face observation, for example.

The solid immersion lens in accordance with the present invention and the sample observation method using the same will further be explained.

Figure 7:
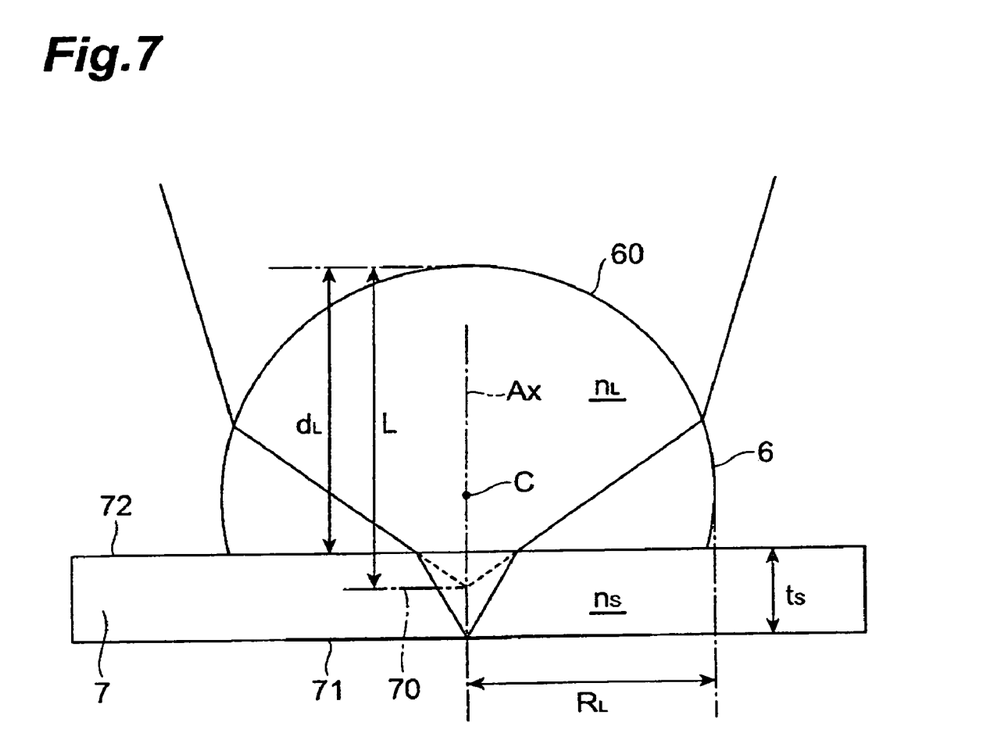
FIG. 7 is a view showing another embodiment of the solid immersion lens and sample observation method in accordance with the present invention.

FIG. 7 is a view showing another embodiment of the solid immersion lens and sample observation method in accordance with the present invention. In this sample observation method, an SIL 6 formed from a material having a refractive index $n_L$ is used as a lens for enlarging a light image from a sample 7 to be observed (e.g., semiconductor device). The SIL 6 is formed such that a spherical optical surface 60 having a radius of curvature $R_L$ about a point C as its spherical center is employed as a lens surface while an axis Ax acts as an optical axis. In this embodiment, the coefficient k is set as in the embodiment of FIG. 3.

In FIG. 7, the surface of the sample 7 opposite from the SIL 6 is employed as an observation surface 71 (e.g., a device surface of a semiconductor device). The SIL 6 is placed such that its flat lens surface on the sample 7 side is in close contact with the rear face 72 of the sample 7. Here, it is assumed that the refractive index of the sample 7 is $n_S$, and the thickness of the sample 7 is $t_S$. The thickness $t_S$ is the thickness of the sample 7 from the rear face 72 to the observation surface 71, which is an actual observation surface with the SIL 6, along the optical axis Ax.

In such a configuration, the thickness of the SIL 6 along the optical axis Ax is $d_L<R_L+k\times(R_L/n_L)$ in order to form a focal point on the observation surface 71 of the sample 7. A sample observation surface 70 which includes a point located downstream of the spherical center C of the lens surface 60 by $k \times (R_L/n_L)$ along the optical axis Ax ($0 < k < 1$) and is substantially orthogonal to the optical axis Ax as mentioned above in connection with FIG. 3. is a virtual observation surface (an apparent observation surface determined from the lens form of the SIL 6) assuming that the refractive index of the sample 7 is identical to the refractive index $n_L$ of the SIL 6.

Here, the distance from the vertex of the SIL 6 to the virtual observation surface 70 along the optical axis Ax is assumed to be $L = R_L + k \times (R_L/n_L)$ as shown in FIG. 7. The distance L corresponds to the focal length of the SIL 6 determined from the form of the lens surface 60. Here, the thickness of the SIL 6 is set so as to satisfy $d_L = L - t_S \times (n_L/n_S)$. In FIG. 7, an optical path converging onto the actual observation surface 71 by way of the SIL 6 and sample 7 is indicated by solid lines. On the other hand, an optical path converging onto the virtual observation surface 70 assuming that the refractive index of the sample 7 is identical to that of the SIL 6 is indicated by dashed lines.

The SIL 6 whose thickness is $d_L = L - t_S \times (n_L/n_S)$ in accordance with this embodiment and the sample observation method using the same employ the coefficient k set by evaluating the geometric aberration characteristic caused by the SIL 6, and sets the lens form of the SIL 6 while taking account of the refractive index $n_S$ and thickness $t_S$ of the sample 7 to be observed. This makes it possible to observe a desirable observing part of the sample 7 favorably while widening the field of view usable for observation as mentioned above. Here, the coefficient k is selected as in the embodiment shown in FIG. 3. In FIG. 7, the thickness $t_S$ of the sample 7 is used as it is since the surface of the sample 7 on the side opposite from the SIL 6 is used as the observation surface 71. When the observation surface is set within the sample 7, it will be sufficient if the thickness of the sample to the observation surface is used as $t_S$.

Figure 8:
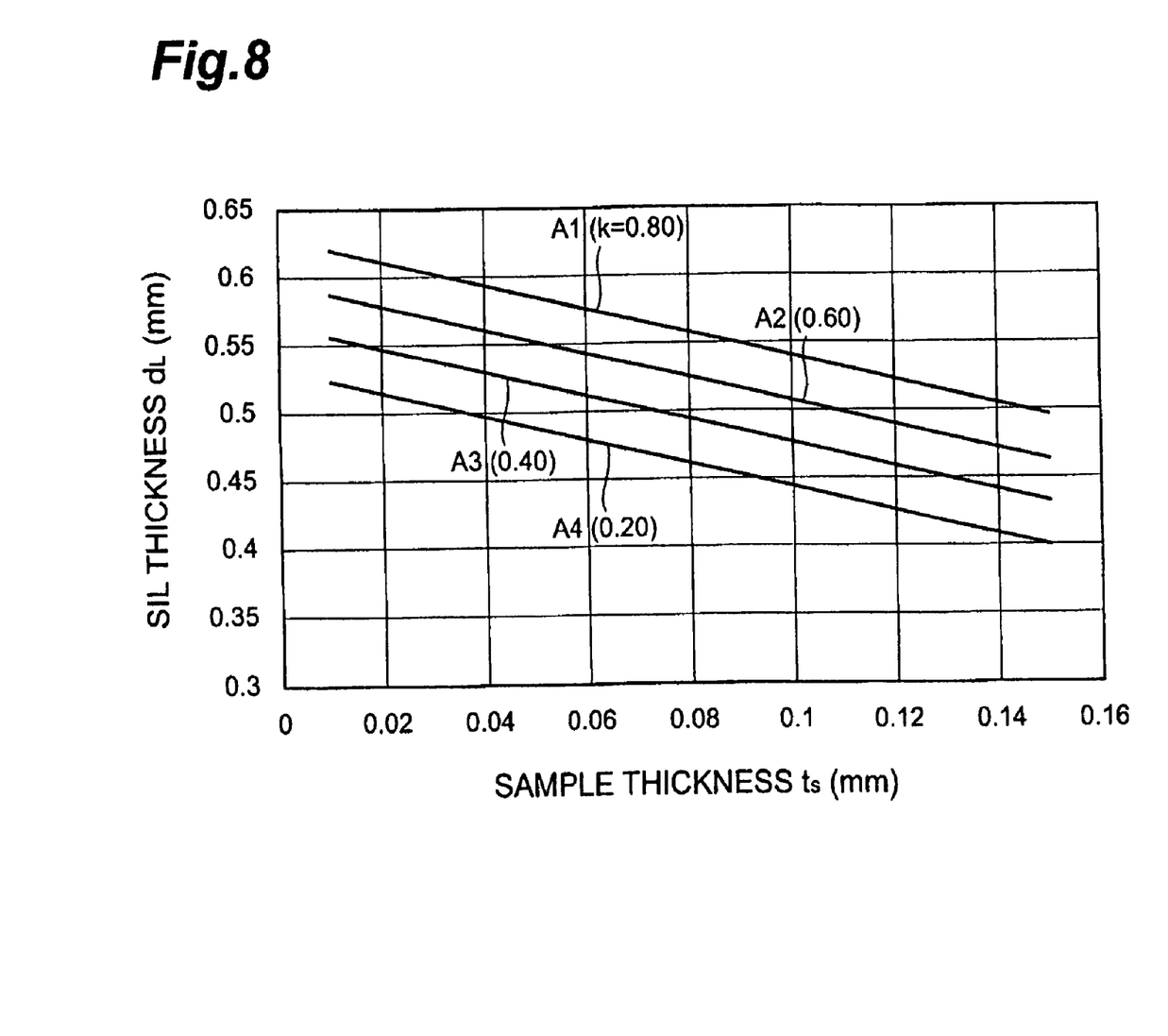
FIG. 8 is a graph showing examples of the correlation between the thickness of a sample and the thickness of SIL.

FIG. 8 is a graph showing examples of the correlation between the sample thickness and the SIL thickness. In this graph, the abscissa indicates the thickness $t_S$ (mm) of the sample 7, whereas the ordinate indicates the thickness $d_L$ (mm) of the SIL 6. In this graph, the refractive index of the SIL 6 is $n_L = 3.1$ (material: GaP), the refractive index of the sample 7 is $n_S = 3.5$ (material: Si), and the radius of curvature of the SIL 6 is $R_L = 0.5$ mm. Here, curves A1, A2, A3, and A4 indicate correlation characteristics at k=0.80, 0.60, 0.40, and 0.20, respectively. The thickness $d_L$ of the SIL 6 is set as in the examples shown in the graph of FIG. 8 according to their materials, values of coefficient k, etc.

The setting of coefficient k in the solid immersion lens and sample observation method will now be explained. When a wide field of view for observation is required, etc., in general, the coefficient k preferably falls within the range of $0.5 < k < 0.7$ as in the above-mentioned example where k=0.6. This enables observations under a condition where the solid immersion lens yields a substantially flat image surface characteristic. For example, the observation with laser light from a monochromatic laser is free from the problem of chromatic aberration, whereby the coefficient k can be set so as to widen the field of view.

In the case where the spherical aberration or chromatic aberration in the solid immersion lens must be taken into consideration, on the other hand, the coefficient k preferably falls within the range of $0 < k < 0.5$ as in the above-mentioned example where k=0.3. This enables observations under a condition where the spherical aberration and chromatic aberration caused by the solid immersion lens are substantially lowered. Such a preferable range of the coefficient k holds in any of the configurations shown in FIGS. 3 and 7.

Figure 9A:
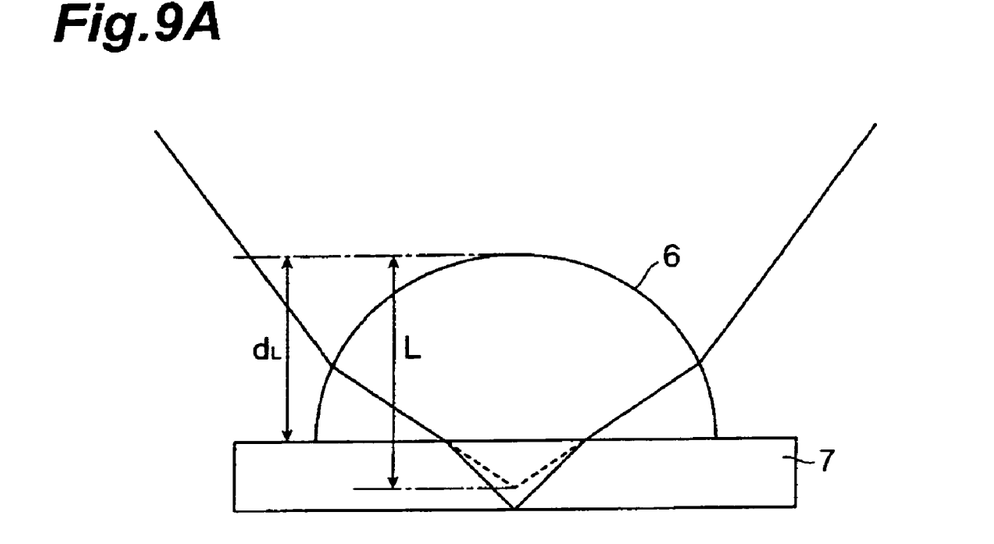
FIGS. 9A and 9B are side views showing the conversion of light in respective cases where the coefficient k is (A) smaller and (B) greater.
Figure 9B:
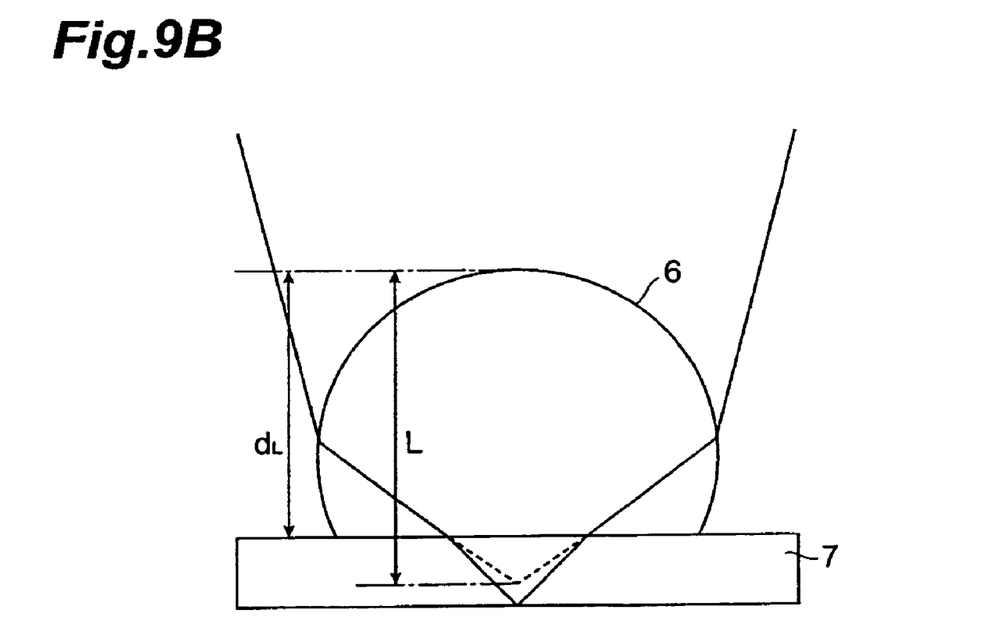

FIGS. 9A and 9B are side views showing the conversion of light when the coefficient k is (A) smaller and (B) greater, respectively. When the coefficient k is set small, e.g., k is set so as to fall within the above-mentioned range of $0 < k < 0.5$, the optical path of light as seen from the SIL becomes wider than that obtained when the coefficient k is greater as shown in FIGS. 9A and 9B. In such a case, it is preferred that, as an objective lens to be combined with the SIL, one having a greater numerical aperture NA be chosen.

Figure 10:
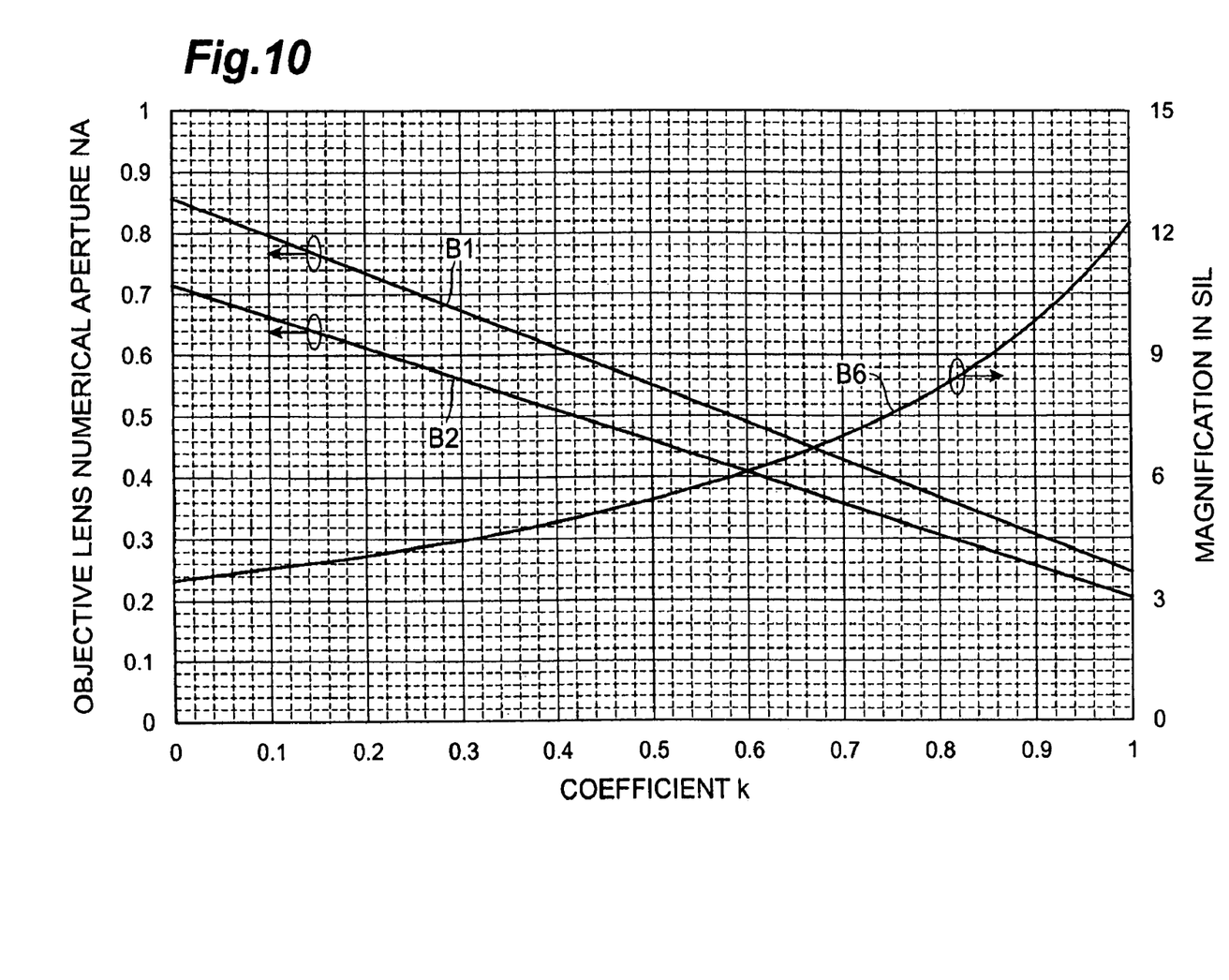
FIG. 10 is a graph showing an example of the correlation between the value of coefficient k in SIL and the numerical aperture NA required for an objective lens.

FIG. 10 is a graph showing examples of correlation between the value of coefficient k in SIL and the numerical aperture NA required for an objective lens. In this graph, the abscissa indicates the coefficient k set in the SIL, whereas the ordinate indicates the numerical aperture NA of the objective lens. In this graph, the refractive index of the SIL is $n_L = 3.5$ (material: Si). Curves B1 and B2 represent the NAs required for the objective lens when the attained NA of the SIL on the optical axis is 3.0 and 2.5, respectively. Also, in this graph, the magnification in the SIL corresponding to the value of coefficient k is represented by curve B6.

As indicated by the curves B1 and B2, the NA required for the objective lens becomes greater as the attained NA in the SIL increases. When the attained NA in the SIL is held constant, the NA required for the objective lens increases as the value of coefficient k decreases as mentioned above in connection with FIGS. 9A and 9B. Therefore, when setting the value of coefficient k in the SIL, its combination with the objective lens must be taken into consideration as well.

Figure 11:
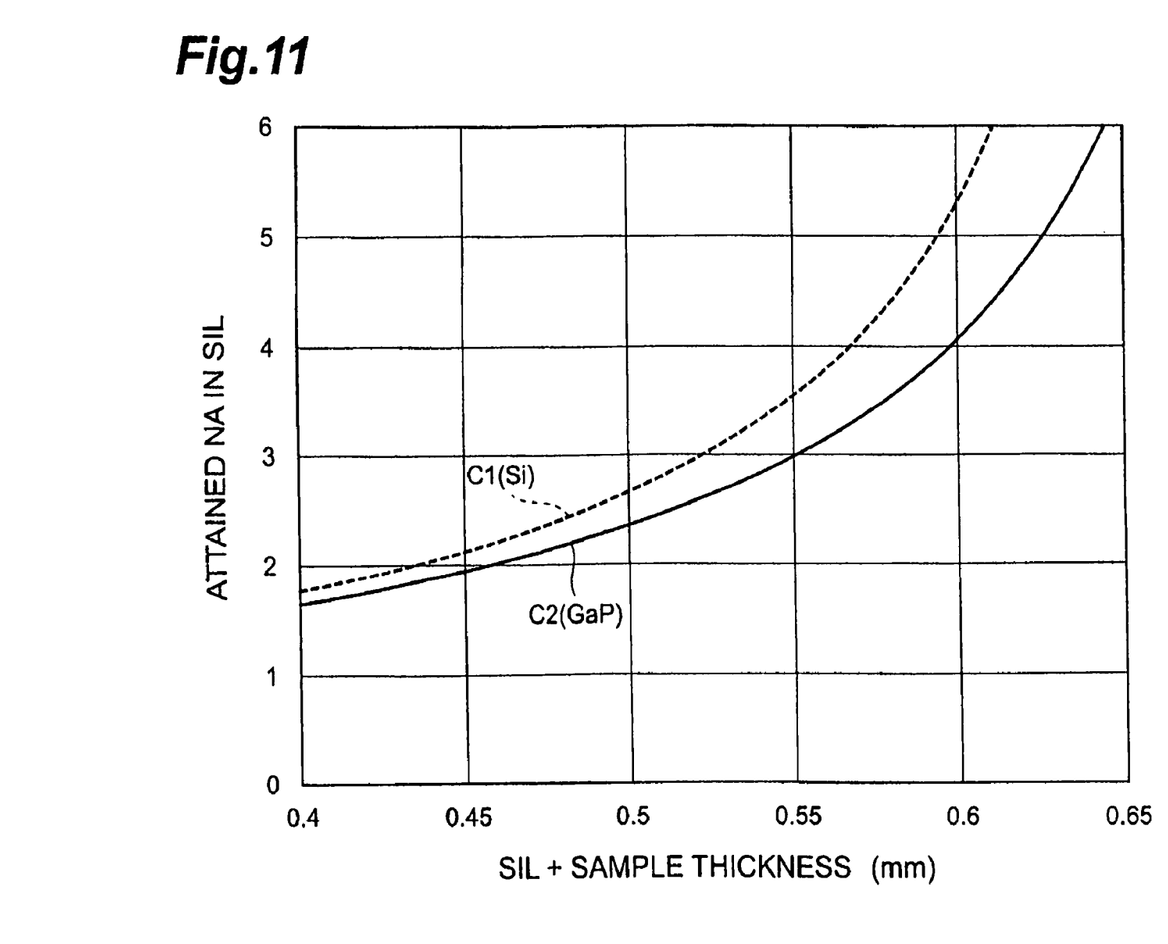
FIG. 11 is a graph showing an example of the correlation between the thickness of SIL+sample and the attained NA on the optical axis in the SIL.

FIG. 11 is a graph showing an example of correlation between the thickness of SIL+sample and the attained NA of SIL on the optical axis. In this graph, the abscissa indicates the thickness (mm) of SIL+sample (Si substrate) from the vertex of SIL, whereas the ordinate indicates the attained NA of SIL on the optical axis. In this graph, the radius of curvature of SIL is $R_L = 0.5$ mm, and the NA of the objective lens is 0.76. Curves C1 and C2 represent attained NA when the material for SIL is Si and GaP, respectively. When the NA of the objective lens is held constant, the attained NA becomes greater as the thickness of SIL+sample increases.

In practice, it will be sufficient if NAs of the SIL and objective lens are selected appropriately according to specific configurations. For example, the attained NA in the SIL is on the order of 2.5 to 3.0, and the NA of the objective lens is about 0.76. As the objective lens, a normal objective lens can be used, whose magnification is about 50×, for example.

When k is set so as to fall within the above-mentioned range of $0 < k \leq 0.5$ in order to reduce chromatic aberration, it is preferable to provide a configuration in which its geometric aberration characteristic can be corrected on the objective lens side. As such an objective lens, one having a configuration shown in the lateral sectional view of FIG. 12 exists. The lens group of this objective lens 5 is constituted by two lens groups, i.e., a first lens group 51 and a second lens group 52, arranged along the optical axis. The gap u between the lens groups 51 and 52 can be changed by rotating a correction ring (not depicted) disposed on the outer peripheral part of the objective lens 5. When thus configured objective lens 5 is used, the geometric aberration characteristic (e.g., spherical aberration) can be corrected on the objective lens 5 side.

Figure 12:
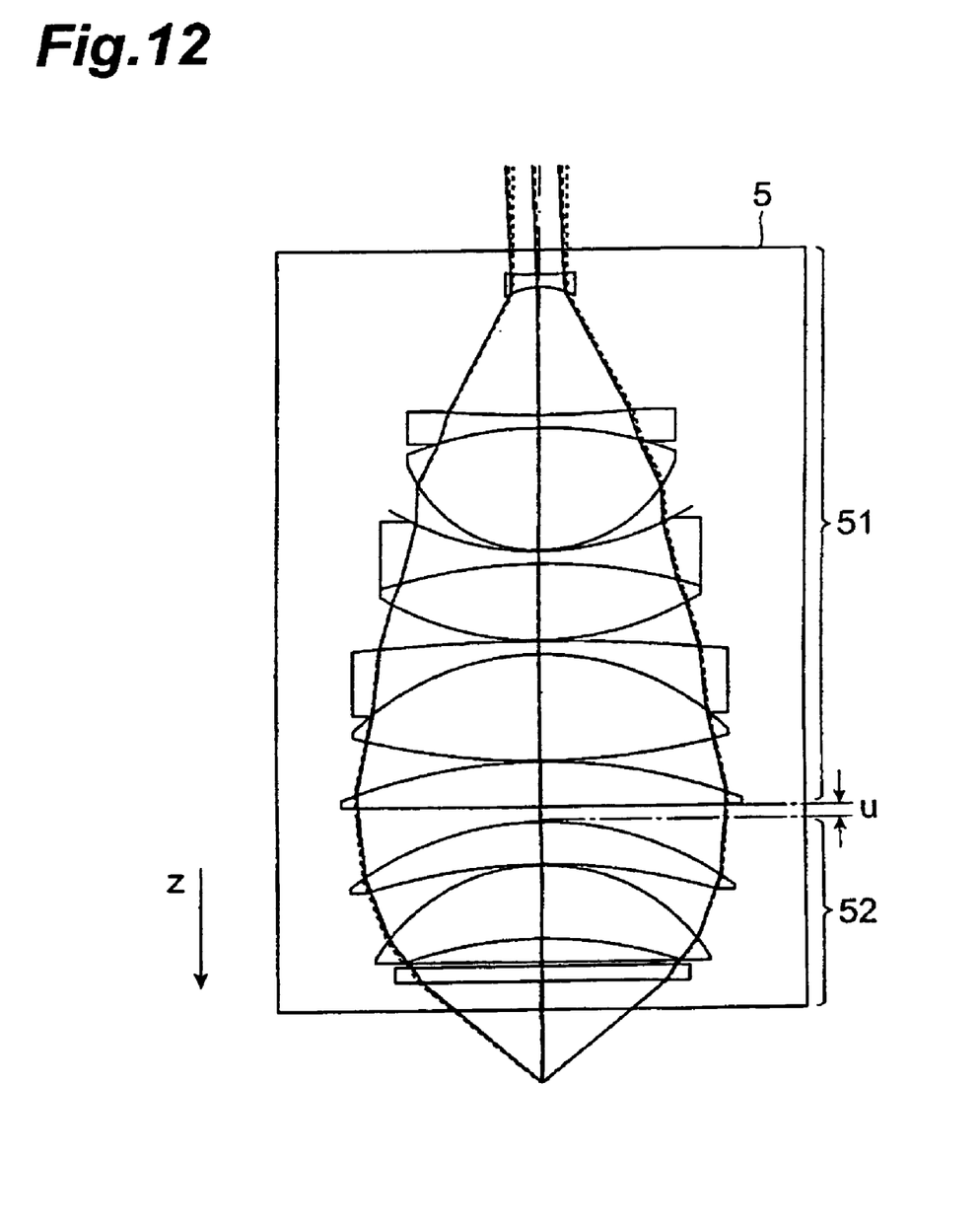
FIG. 12 is a lateral sectional view showing the configuration of an objective lens.

When the objective lens equipped with the correction ring is used in combination with the SIL as such, the coefficient k is preferably set within such a range that the spherical aberration in the SIL can be corrected by the correction ring in the objective lens. In the objective lens configured as shown in FIG. 12 where the refractive index of SIL is $n_L = 3.1$, the radius of curvature is $R_L = 0.5$ mm, and the refractive index of the sample is $n_S=3.5$, for example, the spherical aberration can be corrected by the correction ring under the condition on the order of $0<k<0.4$ if the thickness of the sample is on the order of $t_S=0.03$ mm, and under the condition on the order of $0<k<0.2$ if the thickness of the sample is on the order of $t_S=0.15$ mm.

The coefficient k may be set within the range of $0.7 \leq k<1$. In this case, an objective lens having a lower NA can be combined therewith. Since a normal objective lens generates a large chromatic aberration, it is necessary to use a dedicatedly designed objective lens for purposes other than the monochromatic laser light.

The solid immersion lens (SIL) in accordance with the present invention and the sample observation method using the same can be utilized as a sample observation method which can favorably observe an image of a sample with a solid immersion lens, and the solid immersion lens. Namely, the solid immersion lens and observation method, in which the geometric aberration characteristic caused by the solid immersion lens is evaluated, the coefficient k ($0<k<1$) is set so as to satisfy a predetermined condition, and a surface which includes a point located downstream of the spherical center of the spherical optical surface of the solid immersion lens by $k \times (R_L/n_L)$ along the optical axis and is substantially orthogonal to the optical axis is employed as a sample observation surface, can widen the field of view usable for observation, whereby the sample image can favorably be observed with the solid immersion lens. When the lens form is set while taking account of the refractive index ns and thickness $t_S$ of the sample, a desirable observation part in the sample can favorably be observed.

What is claimed is:

1. A sample observation apparatus comprising an objective lens and a solid immersion lens; wherein the solid immersion lens has a spherical optical surface with a radius of curvature $R_L$ formed from a material having a refractive index $n_L$; wherein the distance along an optical axis from a vertex to a virtual observation surface assuming that a sample to be observed has a refractive index equal to the refractive index $n_L$ of the solid immerson lens is $L=R_L+k \times (R_L/n_L)$, where k ($0<k<1$) is a coefficient set such that the solid immersion lens yields a geometric aberration characteristic satisfying a predetermined condition; and wherein the solid immersion lens has a thickness satisfying $d_L=L-t_S \times (n_L/n_S)$ along the optical axis, where $n_S$ is the refractive index of the sample, and $t_S$ is the thickness of the sample to an actual observation surface.

2. A sample observation apparatus according to claim 1, wherein the coefficient k is a value within the range of $0.5<k<0.7$.

3. A sample observation apparatus according to claim 1, wherein the coefficient k is a value within the range of $0<k \leq 0.5$.

4. A sample observation apparatus according to claim 1, wherein the material for the solid immersion lens is Si.

5. A sample observation apparatus according to claim 1, wherein the material for the solid immersion lens is GaP.

6. A sample observation apparatus according to claim 1, wherein the objective lens comprises a first lens group and a second lens group arranged along the optical axis, and a correction ring for changing a gap between the first lens group and the second lens group to correct the geometric aberration characteristic.

* * * * *